US010057469B2

(12) United States Patent
Leonelli, Jr.

(10) Patent No.: US 10,057,469 B2
(45) Date of Patent: Aug. 21, 2018

(54) CAMERA SHUTTER ARRANGEMENTS AND CAMERA ARRANGEMENTS INCLUDING CAMERA SHUTTER ARRANGEMENTS

(71) Applicant: Autoliv ASP, Inc., Ogden, UT (US)

(72) Inventor: Frank Paul Leonelli, Jr., Goleta, CA (US)

(73) Assignee: VEONEER US, INC., Southfield, MI (US)

( * ) Notice: Subject to any disclaimer, the term of this patent is extended or adjusted under 35 U.S.C. 154(b) by 0 days.

(21) Appl. No.: 15/161,414

(22) Filed: May 23, 2016

(65) Prior Publication Data
US 2017/0339321 A1 Nov. 23, 2017

(51) Int. Cl.
| | |
|---|---|
| *H04N 5/225* | (2006.01) |
| *H04N 7/18* | (2006.01) |
| *H04N 5/235* | (2006.01) |
| *H04N 5/33* | (2006.01) |

(52) U.S. Cl.
CPC ......... *H04N 5/2254* (2013.01); *H04N 5/2353* (2013.01); *H04N 5/33* (2013.01); *H04N 7/183* (2013.01)

(58) Field of Classification Search
CPC .... H04N 5/2254; H04N 5/2353; H04N 7/183; H04N 5/33; G03B 9/00; G03B 9/08; G03B 9/10; G03B 9/46
USPC ................. 396/493, 495, 496, 498
See application file for complete search history.

(56) References Cited

U.S. PATENT DOCUMENTS

| | | | | |
|---|---|---|---|---|
| 2,039,341 | A * | 5/1936 | Parish | G03B 9/10 352/218 |
| 4,876,563 | A * | 10/1989 | Ishida | G02B 7/08 396/448 |
| 4,893,142 | A * | 1/1990 | Ishida | G03B 9/14 396/463 |
| 6,017,156 | A | 1/2000 | Depatie et al. | |
| 6,254,289 | B1 * | 7/2001 | Manabe | G03B 17/00 396/448 |
| 6,334,718 | B1 * | 1/2002 | Akiba | G03B 17/04 359/511 |
| 6,929,410 | B2 * | 8/2005 | Nguyen | G03B 9/10 396/463 |
| 7,161,745 | B2 * | 1/2007 | Onishi | F21V 11/10 348/E5.143 |
| 7,599,001 | B2 | 10/2009 | Nagano | |
| 7,611,295 | B2 * | 11/2009 | Tsai | G03B 11/00 359/511 |
| 9,007,516 | B2 * | 4/2015 | Jang | G03B 9/14 348/368 |
| 2006/0219940 | A1 * | 10/2006 | Pemberton | G03B 9/16 250/472.1 |
| 2012/0207466 | A1 * | 8/2012 | Timpel | G03B 9/10 396/463 |
| 2013/0322866 | A1 * | 12/2013 | Suzuki | G03B 9/10 396/493 |

(Continued)

*Primary Examiner* — Albert Cutler
(74) *Attorney, Agent, or Firm* — Brinks Gilson & Lione

(57) ABSTRACT

A camera shutter arrangement is provided. The camera shutter arrangement includes a motor. A pinion gear is operatively coupled to the motor. An integral paddle-gear member includes a paddle portion and a gear portion. The gear portion extends from the paddle portion and meshes with the pinion gear to move the paddle portion between a first position and a second position when the motor is energized.

19 Claims, 3 Drawing Sheets

(56) References Cited

U.S. PATENT DOCUMENTS

2015/0234255 A1* 8/2015 Takahashi ................ G03B 9/08
396/489

* cited by examiner

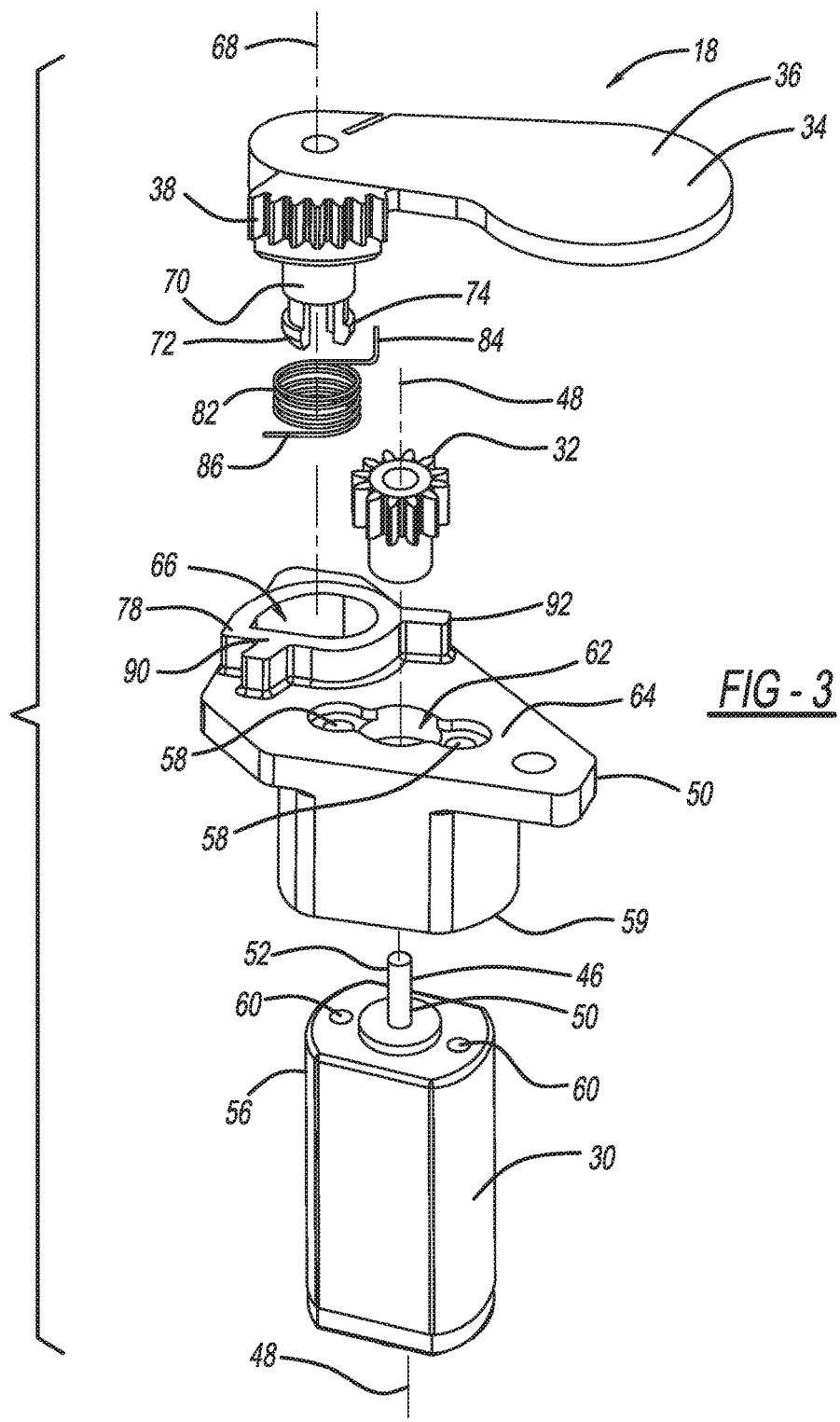

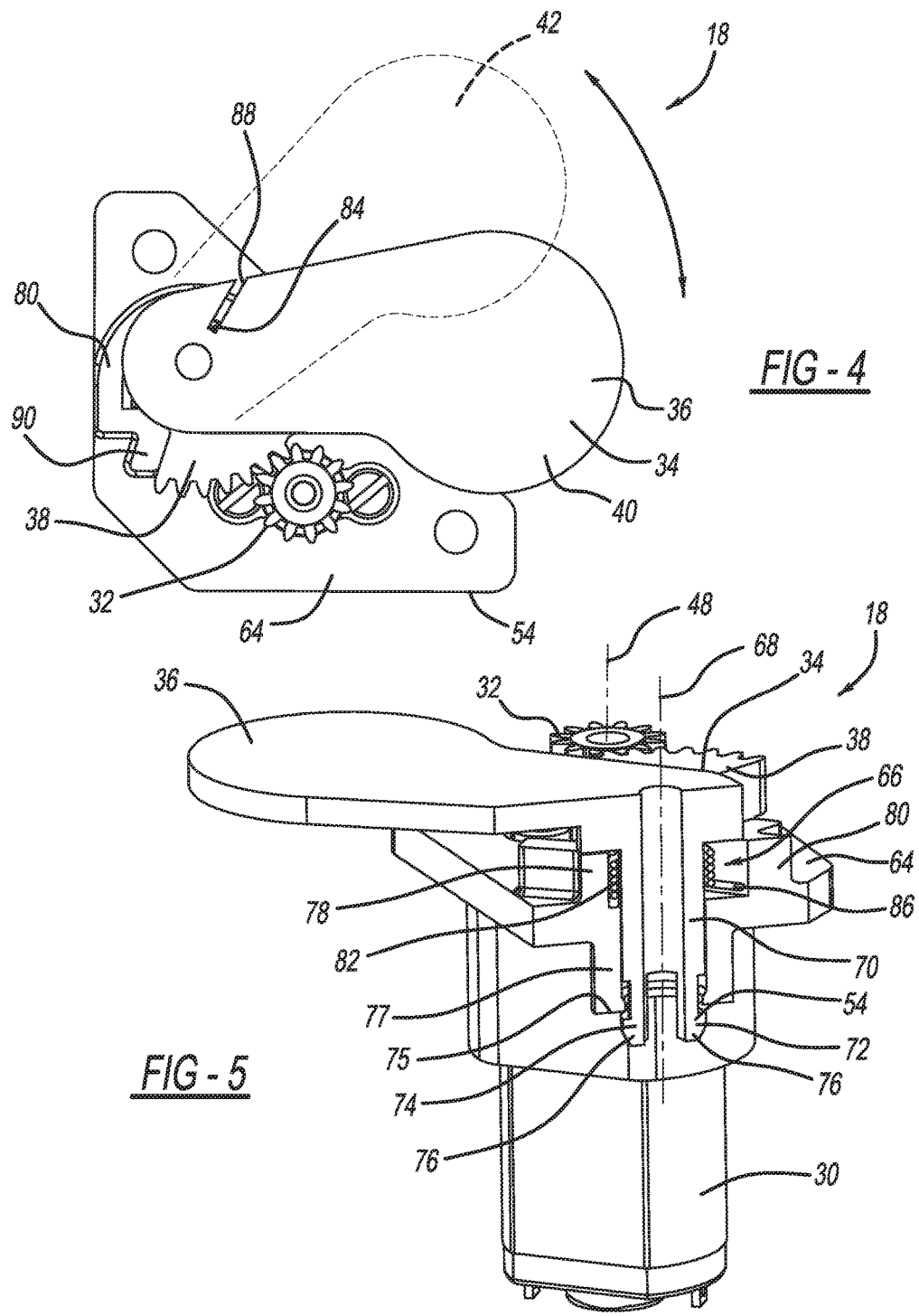

CAMERA SHUTTER ARRANGEMENTS AND CAMERA ARRANGEMENTS INCLUDING CAMERA SHUTTER ARRANGEMENTS

TECHNICAL FIELD

The technical field relates generally to camera or vision systems, and more particularly relates to camera shutter arrangements and camera arrangements including such shutter arrangements, such as, for example, for thermal imaging night vision cameras for motor vehicles.

BACKGROUND

In recent years, vehicle drive supporting systems that include a camera mounted on the motor vehicle have been proposed. In many of these systems, a camera is used to collect forward data in a vehicle running direction, e.g., forward direction, to provide information for safety to the driver and/or to facilitate automatically performing a vehicle control operation or the like. For example, thermal imaging night vision cameras can be attached to the front end of motor vehicles for assisting drivers in detecting pedestrians and/or animals.

A camera shutter is utilized in a wide variety of camera applications to generally control when electromagnetic radiation, e.g., light, reaches the camera's imaging system. For example, a camera shutter may be employed in a thermal imaging night vision camera to calibrate or normalize the infrared sensor. In particular, thermal imaging night vision cameras include a sensor that is sensitive to light in the infrared region. However, such sensors are affected by temperature and need to be continuously recalibrated. These camera systems typically include a camera shutter mechanism that includes a paddle that can be temporarily positioned in front of the sensor to block the incoming light and that effectively act as a black body for recalibrating or normalizing the sensor.

It is desirable for a camera shutter mechanism to possess certain features or functions, such as low-cost and ease of manufacturing, small and lightweight, low power requirements, and reliability over an extended period of time, frequency of use, or wide temperature range. There is a need to improve such features or functions of camera shutter mechanisms and cameras that include shutter mechanisms.

BRIEF SUMMARY

Camera shutter arrangements and camera arrangements including camera shutter arrangements are provided herein. In accordance with an exemplary embodiment, a camera shutter arrangement includes a motor. A pinion gear is operatively coupled to the motor. An integral paddle-gear member includes a paddle portion and a gear portion. The gear portion extends from the paddle portion and meshes with the pinion gear to move the paddle portion between a first position and a second position when the motor is energized.

In accordance with another exemplary embodiment, a camera arrangement is provided. The camera arrangement includes a sensor. An optical arrangement is adapted to focus incoming light onto the sensor. A camera shutter arrangement is for controlling exposure of the sensor to the incoming light. The camera shutter arrangement includes a motor. A pinion gear is operatively coupled to the motor. An integral paddle-gear member includes a paddle portion and a gear portion. The gear portion extends from the paddle portion and meshes with the pinion gear to move the paddle portion between a blocking position and a non-blocking position when the motor is energized. In the blocking position, the paddle portion blocks the incoming light to the sensor. In the non-blocking position, the paddle portion allows the incoming light to pass to the sensor.

Further objects, features, and advantages of the invention will become apparent to those skilled in the art to which the present invention relates from consideration of the following description and the appended claims, taken in conjunction with the accompanied drawings.

BRIEF DESCRIPTION OF THE DRAWINGS

The drawings described herein are for illustration purposes only and are not intended to limit the scope of the present disclosure in any way.

FIG. 3 is a perspective view of a camera shutter arrangement in accordance with an exemplary embodiment;

FIG. 4 is a top view of a camera shutter arrangement in accordance with an exemplary embodiment; and FIG. 5 is a perspective partial-sectional side view of a camera shutter arrangement in accordance with an exemplary embodiment.

DETAILED DESCRIPTION OF THE INVENTION

The following description is merely exemplary in nature and is not intended to limit the present disclosure or its application or uses.

Figure 1:
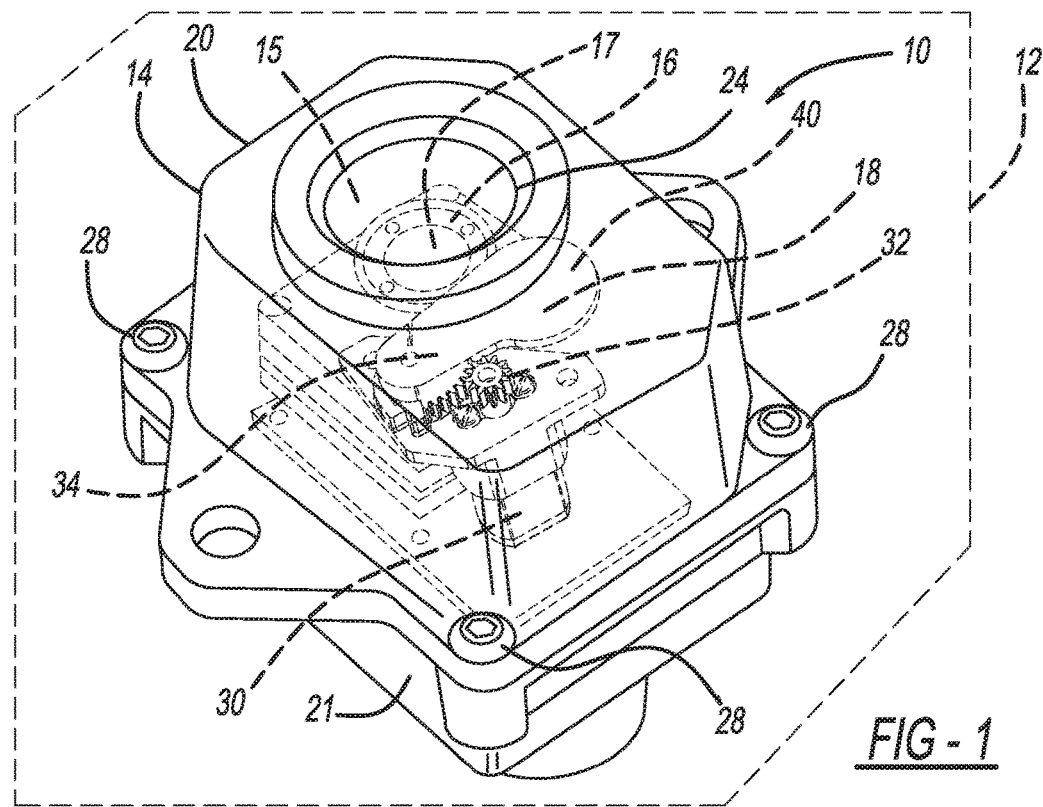
FIG. 1 is a partial transparent perspective view of a camera arrangement in accordance with an exemplary embodiment.
Figure 2:
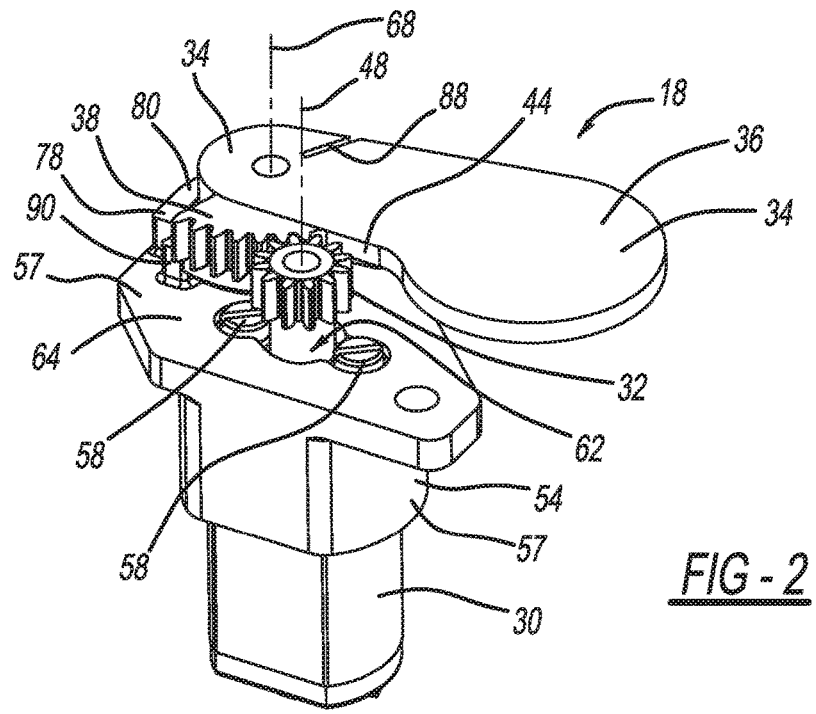
FIG. 2 is an exploded view of a camera shutter arrangement in accordance with an exemplary embodiment.

Referring now to the drawings, FIG. 1 shows a camera arrangement 10 for a motor vehicle 12 (schematically illustrated as dashed lines) in accordance with an exemplary embodiment. As shown, the camera arrangement 10 includes a sealed enclosure assembly 14 that at least partially encloses a camera system 16.

In an exemplary embodiment, the camera system 16 is configured to collect incoming light as data when mounted on the motor vehicle 12. In one example, the camera system 16 collects incoming light in a vehicle running direction (e.g., forward direction) to collect images of a forward road environment while running and provides an image signal to an image processing unit that converts the image signal to a various kind of forward data that can be used by one or more other devices and/or control units for driving support.

In one embodiment, the camera system 16 may be, for example, a thermal imaging night vision camera system and includes an optical arrangement 15 adapted to focus incoming light (e.g., in a vehicle running direction) onto a sensor 17 (e.g., an infrared (IR) sensing arrangement that is sensitive to light in the infrared region). The sensor 17 generates an output signal and the camera system 16 further includes processing electronics to process the output signal for assisting a vehicle driver in detecting, for example, a pedestrian(s), an animal(s), and/or the like. As will be discussed in further detail below, the camera system 16 also includes a camera shutter arrangement 18 for controlling exposure of the sensor 17 to the incoming light, for example, to calibrate or normalize the sensor 17.

The sealed enclosure assembly 14 includes a front housing 20 enclosing, for example, a forward facing portion of the camera system 16 and a window 24 mounted in the front housing aligned with the optical arrangement 15. The window 24 is sized to permit light to pass through the front housing 20 to the camera system 16, e.g., the optical arrangement 15, for collecting, focusing, and/or processing the light. As illustrated, a rear housing 21, which may be configured as, include, or carry a heatsink, is attached to the front housing 20 via threaded fasteners 28 to enclose the camera system 16. The heatsink, if present, facilitates thermal management of the camera system 16.

Referring to FIGS. 1-5, the camera shutter arrangement 18 includes a motor 30, a pinion gear 32 operatively coupled to the motor 30, and an integral paddle-gear member 34. The integral paddle-gear member 34 includes a paddle portion 36 and a gear portion 38. As will be discussed in further detail below, the gear portion 38 extends from the paddle portion 36 and meshes with the pinion gear 32 to move the paddle portion 36 between a non-blocking position 40, which allows the incoming light to pass to the sensor 17, and a blocking position 42, which blocks the incoming light to the sensor 17, when the motor 30 is energized.

In an exemplary embodiment, the integral paddle-gear member 34 is a monolithic structure. For example, the integral paddle-gear member 34 may be formed of a plastic or polymeric material via an injection molding process in which the paddle portion 36 and the gear portion 38 are integrally formed as a single piece in a common mold cavity. As illustrated, the gear portion 38 is configured as a sector gear that extends laterally from an inboard edge 44 of the paddle portion 36 such that the paddle portion 36 and the gear portion 38 are substantially planar.

Operatively coupled to the motor 30 is a motor shaft 46 that rotates about an axis 48 in response to when the motor 30 is energized. The motor shaft 46 has a proximal end portion 50 coupled to the motor 30 and a distal end portion 52 coupled to the pinion gear 32 to drive the pinion gear 32 to rotate about the axis 48. In an exemplary embodiment, the pinion gear 32 is friction fit or press-fit to the distal end portion 52 of the motor shaft 46.

A housing 54, e.g., a motor mount housing, is coupled to and/or encloses at least a portion 56 of the motor 30 that is adjacent to or proximate the motor shaft 46. As illustrated, the housing 54 has a pocket portion 55 with an open end 59 for receiving the motor 30, and a substantially planar portion 57 arranged opposite the open end 59 of the pocket portion 55. The pocket portion 55 extends transversely from the substantially planar portion 57 and together the portions 55 and 57 of the housing 54 encloses the portion 56 of the motor 30.

A channel 62 extends through the substantially planar portion 57 along the axis 48 and parallel to a longitudinal axis of the pocket portion 55. The motor shaft 46 extends through the channel 62 to position the pinion gear 32 adjacent to an outer surface 64 of the substantially planar portion 57 of the housing 54.

As illustrated, fasteners 58 extend through the substantially planar portion 57 adjacent to the channel 62 to couple the housing 54 to the motor 30. In particular, the fasteners 58 are received in and engage the walls of threaded openings 60 to mount and fasten the substantially planar portion 57 to the portion 56 of the motor 30.

The integral paddle-gear member 34 is operatively coupled to the housing 54 such that the integral paddle-gear member 34 can be selectively moved between the non-blocking position 40 and the blocking position 42. In an exemplary embodiment, the housing 54 has a cavity 66 that extends through the substantially planar portion 57 along an axis 68 that is substantially parallel to the axis 48.

The integral paddle-gear member 34 has an elongated projection 70 that extends generally transverse to the paddle portion 36 and that is disposed in the cavity 66 coaxially with the axis 68. As illustrated, the paddle portion 36 and the gear portion 38 are adjacent to the outer surface 64 of the substantially planar portion 57 with the teeth of the gear portion 38 in engaging relationship with the teeth of the pinion gear 32. As such, when the motor 30 is energized, the motor shaft 46 rotates the pinion gear 32 about the axis 48 and the pinion gear 32 meshes with the gear portion 38 to rotate the paddle portion 36 about the axis 68 to move the paddle portion 36 between the non-blocking position 40 and the blocking position 42.

In an exemplary embodiment, the elongated projection 70 includes a snapfit arrangement 72 that engages the housing 54 adjacent to the cavity 66 to help hold or prevent the integral paddle-gear member 34 from moving axially out of the cavity 66 but allows the integral paddle-gear member 34 to rotate in the cavity 66 about the axis 68. In an exemplary embodiment, the elongated projection 70 includes a plurality of cantilever clips 74. The cantilever clips 74 correspondingly have positive snapfit features 76 disposed distally on the cantilever clips 74 that engage a lower edge portion 75 of a wall 77 that extends transversely downward from the substantially planar portion 57 defining a lower portion of the cavity 66.

A wall 78 extends upward from the substantially planar portion 57 opposite the wall 77 to define a raised outer portion 80. The raised outer portion 80 surrounds and defines an upper portion of the cavity 66 adjacent to an interface between the elongated projection 70 and the paddle portion 36 of the integral paddle-gear member 34.

In an exemplary embodiment, a spring 82 (e.g., a torsional coil spring or the like) is disposed in the cavity 66 operatively coupled to the housing 54 and the integral paddle-gear member 34. The spring 82 is for biasing the position of the paddle portion 36. In one embodiment, the spring 82 biases the paddle portion 36 to the non-blocking position 40 and the motor 30 when energized drives the paddle portion 36 to the blocking position 42.

As illustrated, the spring 82 has end portions 84 and 86 that are disposed at opposite ends of the coil spring 82. The end portion 84 of the spring 82 engages the paddle portion 36 and the end portion 86 of the spring 82 engages the interior surface of the wall facing the cavity 66. In one embodiment, the paddle portion 36 has a slot 88 formed therethrough adjacent to the axis 68 of rotation of the integral paddle-gear member 34 and the end portion 84 is disposed in the slot 88. As such, the end portion 86 is restrained or compressed against the wall 78 of the cavity 66 while the end portion 86 can push against the sidewalls of the slot 88 of the paddle portion 36 to cause the paddle portion 36 to be biased, for example, to the non-blocking position 40.

In an exemplary embodiment, the raised outer portion 80 includes spaced apart stops 90 and 92. The stops 90 and 92 are positioned for interfacing with the integral paddle-gear member 34 to limit movement of the paddle portion 36 beyond the non-blocking and blocking positions 40 and 42, respectively. In one example, the stops 90 and 92 are positioned for interfacing directly with the gear portion 38 to limit movement of the paddle portion beyond the non-blocking and blocking positions 40 and 42, respectively.

Accordingly, the camera shutter arrangements and camera arrangements including camera shutter arrangements have been described. The exemplary embodiments described herein include a camera shutter arrangement including a motor and a pinion gear operatively coupled to the motor. An integral paddle-gear member includes a paddle portion and a gear portion that extends from the paddle portion and that meshes with the pinion gear to move the paddle portion between a non-blocking position, which allows incoming light to pass to a camera sensor, and a blocking position, which blocks the incoming light to the camera sensor, when the motor is energized. In an exemplary embodiment, the camera shutter arrangement including the integral paddle-gear member provides a camera shutter mechanism that is relatively low-cost, easy to manufacture, small and lightweight, requires relatively low power to operate, and is reliability over an extended period of time, frequency of use, and/or wide temperature range.

As a person skilled in the art will readily appreciate, the above description is meant as an illustration of the implementation of the principles of this invention. This description is not intended to limit the scope or application of this invention in that the invention is susceptible to modification, variation, and change, without departing from the spirit of this invention as defined in the following claims.

The invention claimed is:

1. A camera shutter arrangement comprising:
   a motor;
   a pinion gear operatively coupled to the motor;
   an integral paddle-gear member comprising a paddle portion and a gear portion that extends from the paddle portion and that meshes with the pinion gear to move the paddle portion between a first position and a second position when the motor is energized; and
   a housing coupled to or enclosing at least a portion of the motor,
   wherein the housing has a cavity formed therethrough and the integral paddle-gear member has an elongated projection that extends generally transverse to the paddle portion, and the elongated projection is disposed in the cavity with the paddle portion and the gear portion disposed adjacent to an outer surface of the housing.

2. The camera shutter arrangement of claim 1, wherein the integral paddle-gear member is a monolithic structure.

3. The camera shutter arrangement of claim 1, wherein the integral paddle-gear member is operatively coupled to the housing.

4. The camera shutter arrangement of claim 3, further comprising a motor shaft having a proximal end portion operatively coupled to the motor and a distal end portion operatively coupled to the pinion gear to drive the pinion gear when the motor is energized.

5. The camera shutter arrangement of claim 4, wherein the pinion gear is friction fit or press-fit to the distal end portion of the motor shaft.

6. The camera shutter arrangement of claim 4, wherein the housing has a channel formed therethrough and the motor shaft is disposed through the channel to position the pinion gear adjacent to the outer surface of the housing.

7. The camera shutter arrangement of claim 6, wherein the channel has a longitudinal channel axis and the cavity has a longitudinal cavity axis that is substantially parallel to the longitudinal channel axis.

8. The camera shutter arrangement of claim 6, wherein the elongated projection defines a first axis of rotation for the paddle portion and the motor shaft defines a second axis of rotation for the pinion gear, and wherein the first axis of rotation and the second axis of rotation are substantially parallel.

9. The camera shutter arrangement of claim 1, wherein the paddle portion and the gear portion are substantially planar.

10. The camera shutter arrangement of claim 1, wherein the elongated projection comprises a snapfit arrangement that engages the housing adjacent to the cavity.

11. The camera shutter arrangement of claim 1, further comprising a spring disposed in the cavity and operatively coupled to the housing and the integral paddle-gear member to bias the paddle portion to the first position or the second position.

12. The camera shutter arrangement of claim 11, wherein the first position is a blocking position for blocking incoming light with the paddle portion to a sensor of a camera arrangement and the second position is a non-blocking position that allows the incoming light to pass to the sensor, and wherein the spring biases the paddle portion to the non-blocking position.

13. The camera shutter arrangement of claim 11, wherein the spring has a first end portion and a second end portion that is opposite the first end portion, and wherein the first end portion engages a wall of the cavity and the second end portion engages the paddle portion.

14. The camera shutter arrangement of claim 13, wherein the paddle portion has a slot formed therethrough and the second end portion of the spring is disposed in the slot.

15. The camera shutter arrangement of claim 1, wherein the outer surface of the housing has a substantially planar outer surface portion and a raised outer portion that extends from the substantially planar outer surface portion and that surrounds the cavity adjacent to an interface between the elongated projection and the paddle portion.

16. The camera shutter arrangement of claim 15, wherein the raised outer portion comprises a first stop and a second stop that is spaced apart from the first stop, and wherein the first and second stops are positioned for interfacing with the integral paddle-gear member to limit movement of the paddle portion beyond the first position and the second position, respectively.

17. The camera shutter arrangement of claim 16, wherein the first and second stops are positioned for interfacing directly with the gear portion to limit movement of the paddle portion beyond the first position and the second position, respectively.

18. A camera arrangement comprising:
   a sensor;
   an optical arrangement adapted to focus incoming light onto the sensor; and
   a camera shutter arrangement for controlling exposure of the sensor to the incoming light, the camera shutter arrangement comprising:
      a motor;
      a pinion gear operatively coupled to the motor;
      an integral paddle-gear member comprising a paddle portion and a gear portion that extends from the paddle portion and that meshes with the pinion gear to move the paddle portion between a blocking position and a non-blocking position when the motor is energized, wherein in the blocking position the paddle portion blocks the incoming light to the sensor and in the non-blocking position the paddle portion allows the incoming light to pass to the sensor; and
      a housing coupled to or enclosing at least a portion of the motor, wherein the housing has a cavity formed therethrough and the integral paddle-gear member has an elongated projection that extends generally transverse to the paddle portion, and the elongated projection is disposed in the cavity with the paddle portion and the gear portion disposed adjacent to an outer surface of the housing.

19. A camera shutter arrangement comprising:

a motor;

a pinion gear operatively coupled to the motor;

an integral paddle-gear member comprising a paddle portion and a gear portion that extends from the paddle portion and that meshes with the pinion gear to move the paddle portion between a first position and a second position when the motor is energized;

a housing coupled to or enclosing at least a portion of the motor; and a motor shaft having a proximal end portion operatively coupled to the motor and a distal end portion operatively coupled to the pinion gear to drive the pinion gear when the motor is energized;

wherein the housing has a channel formed therethrough and the motor shaft is disposed through the channel to position the pinion gear adjacent to an outer surface of the housing, and wherein the housing has a cavity formed therethrough and the integral paddle-gear member has an elongated projection that extends generally transverse to the paddle portion and that is disposed in the cavity with the paddle portion and the gear portion disposed adjacent to the outer surface of the housing.

* * * * *